(12) United States Patent
Nakamura (10) Patent No.: US 12,412,354 B2
(45) Date of Patent: Sep. 9, 2025

(54) INFORMATION PROCESSING APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Naohito Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 18/307,107

(22) Filed: Apr. 26, 2023

(65) Prior Publication Data

US 2023/0368483 A1  Nov. 16, 2023

(30) Foreign Application Priority Data

May 16, 2022  (JP) .................................. 2022-080036

(51) Int. Cl.
*G06T 19/20*  (2011.01)
*G06T 7/70*  (2017.01)
*G06V 10/74*  (2022.01)

(52) U.S. Cl.
CPC ............... *G06T 19/20* (2013.01); *G06T 7/70* (2017.01); *G06V 10/761* (2022.01); *G06T 2219/2004* (2013.01); *G06T 2219/2016* (2013.01)

(58) Field of Classification Search
CPC ... G06T 19/20; G06T 7/70; G06T 2219/2004; G06T 2219/2016; G06T 19/00; G06F 3/011; G06F 3/012; G06F 3/014; G06F 3/0346; G06F 3/017; G06V 20/20; G06V 40/28; G06V 10/761

See application file for complete search history.

(56) References Cited

U.S. PATENT DOCUMENTS

| 10,537,795 B2 | 1/2020 | Bristol |
| 2009/0070093 A1* | 3/2009 | Nakanishi ............... A63F 13/00 703/22 |
| 2013/0104084 A1* | 4/2013 | Mlyniec ................ G06F 3/0346 715/849 |

(Continued)

FOREIGN PATENT DOCUMENTS

| JP | 2020-519992 A | 7/2020 |
| JP | 2021-60627 A | 4/2021 |
| JP | 2022-78778 A | 5/2022 |

*Primary Examiner* — Xilin Guo
(74) *Attorney, Agent, or Firm* — Carter, DeLuca & Farrell LLP (57) ABSTRACT

An information processing apparatus according to the present invention acquires information indicating a position or an orientation of an object for operating a virtual object; and controls a position or an orientation of a graphic corresponding to the object on a basis of the acquired information, wherein the position or the orientation of the graphic in a first state is controlled on a basis of first information that is information indicating the position or the orientation of the graphic in the first state in which the information is acquired with accuracy higher than predetermined accuracy and second information that is information indicating the position or the orientation of the graphic in a second state in which the information is not acquired with the accuracy higher than the predetermined accuracy.

20 Claims, 7 Drawing Sheets

(56) References Cited

U.S. PATENT DOCUMENTS

| | | | |
|---|---|---|---|
| 2014/0204002 A1* | 7/2014 | Bennet | G06F 3/017 |
| | | | 345/7 |
| 2016/0217612 A1* | 7/2016 | Petill | G06T 7/70 |
| 2017/0060230 A1* | 3/2017 | Faaborg | G06F 3/017 |
| 2017/0115727 A1* | 4/2017 | Matsuike | G06T 19/20 |

* cited by examiner

INFORMATION PROCESSING APPARATUS, INFORMATION PROCESSING METHOD, AND NON-TRANSITORY COMPUTER READABLE MEDIUM

BACKGROUND OF THE INVENTION

Field of the Invention

The present invention relates to an information processing apparatus, an information processing method, and a non-transitory computer readable medium.

Description of the Related Art

In recent years, virtual reality (VR) systems or mixed reality (MR) systems aiming to seamlessly merge a reality space and a virtual space with each other have been actively developed. A head-mounted display (HMD) is a glasses-type apparatus with a small display that is to be attached to the head of a user. At the time of operating a user interface (UI) via an HMD, a hand controller is used to convert the movement of a hand into an operation in a virtual space. On the basis of the position/orientation (position and orientation (direction)) of the hand controller, virtual light, a virtual pointer, or the like, which is called a ray, is displayed in a VR system or an MR system, whereby a user is enabled to freely operate a virtual object.

Japanese Translation of PCT Application No. 2020-519992 proposes a hand controller that emits a plurality of beams of infrared light (IR light) so that a camera mounted in an HMD is enabled to receive the infrared light and detect the position/orientation of a hand. Japanese Patent Application Laid-open No. 2021-60627 proposes an apparatus that estimates the position/orientation of a hand controller using an image captured by a camera mounted in the hand controller.

In the technology disclosed in Japanese Translation of PCT Application No. 2020-519992 or Japanese Patent Application Laid-open No. 2021-60627, there is a case where accuracy in detecting the position/orientation of the hand controller reduces. Further, there is a possibility that the position or orientation of a graphic such as a ray based on the position/orientation of the hand controller largely changes in a short period of time in accordance with a change in accuracy in detecting the position/orientation of the hand controller. Therefore, conventional user interfaces are less convenient.

SUMMARY OF THE INVENTION

The present invention provides a more convenient user interface as a user interface in a VR system, an MR system, or the like.

The present invention in its first aspect provides an information processing apparatus including at least one memory and at least one processor which function as: an acquisition unit configured to acquire information indicating a position or an orientation of an object for operating a virtual object; and a control unit configured to control a position or an orientation of a graphic corresponding to the object on a basis of the information acquired by the acquisition unit, wherein the control unit controls the position or the orientation of the graphic in a first state on a basis of first information that is information indicating the position or the orientation of the graphic in the first state in which the information is acquired with accuracy higher than predetermined accuracy and second information that is information indicating the position or the orientation of the graphic in a second state in which the information is not acquired with the accuracy higher than the predetermined accuracy.

The present invention in its second aspect provides an information processing method including: an acquisition step of acquiring information indicating a position or an orientation of an object for operating a virtual object; and a control step of controlling a position or an orientation of a graphic corresponding to the object on a basis of the information acquired in the acquisition step, wherein in the control step, the position or the orientation of the graphic in a first state is controlled on a basis of first information that is information indicating the position or the orientation of the graphic in the first state in which the information is acquired with accuracy higher than predetermined accuracy and second information that is information indicating the position or the orientation of the graphic in a second state in which the information is not acquired with the accuracy higher than the predetermined accuracy.

The present invention in its third aspect provides a non-transitory computer readable medium that stores a program, wherein the program causes a computer to execute an information processing method including: an acquisition step of acquiring information indicating a position or an orientation of an object for operating a virtual object; and a control step of controlling a position or an orientation of a graphic corresponding to the object on a basis of the information acquired in the acquisition step, wherein in the control step, the position or the orientation of the graphic in a first state is controlled on a basis of first information that is information indicating the position or the orientation of the graphic in the first state in which the information is acquired with accuracy higher than predetermined accuracy and second information that is information indicating the position or the orientation of the graphic in a second state in which the information is not acquired with the accuracy higher than the predetermined accuracy.

Further features of the present invention will become apparent from the following description of exemplary embodiments with reference to the attached drawings.

DESCRIPTION OF THE EMBODIMENTS

Hereinafter, embodiments for carrying out the present invention will be described in detail with reference to the accompanying drawings. Note that the following embodiments are given as an example for realizing the present invention and should be appropriately corrected or changed depending on the configurations or various conditions of an apparatus to which the present invention is applied. The present invention is not limited to the following embodiments.

First Embodiment

Configuration

Figure 1:
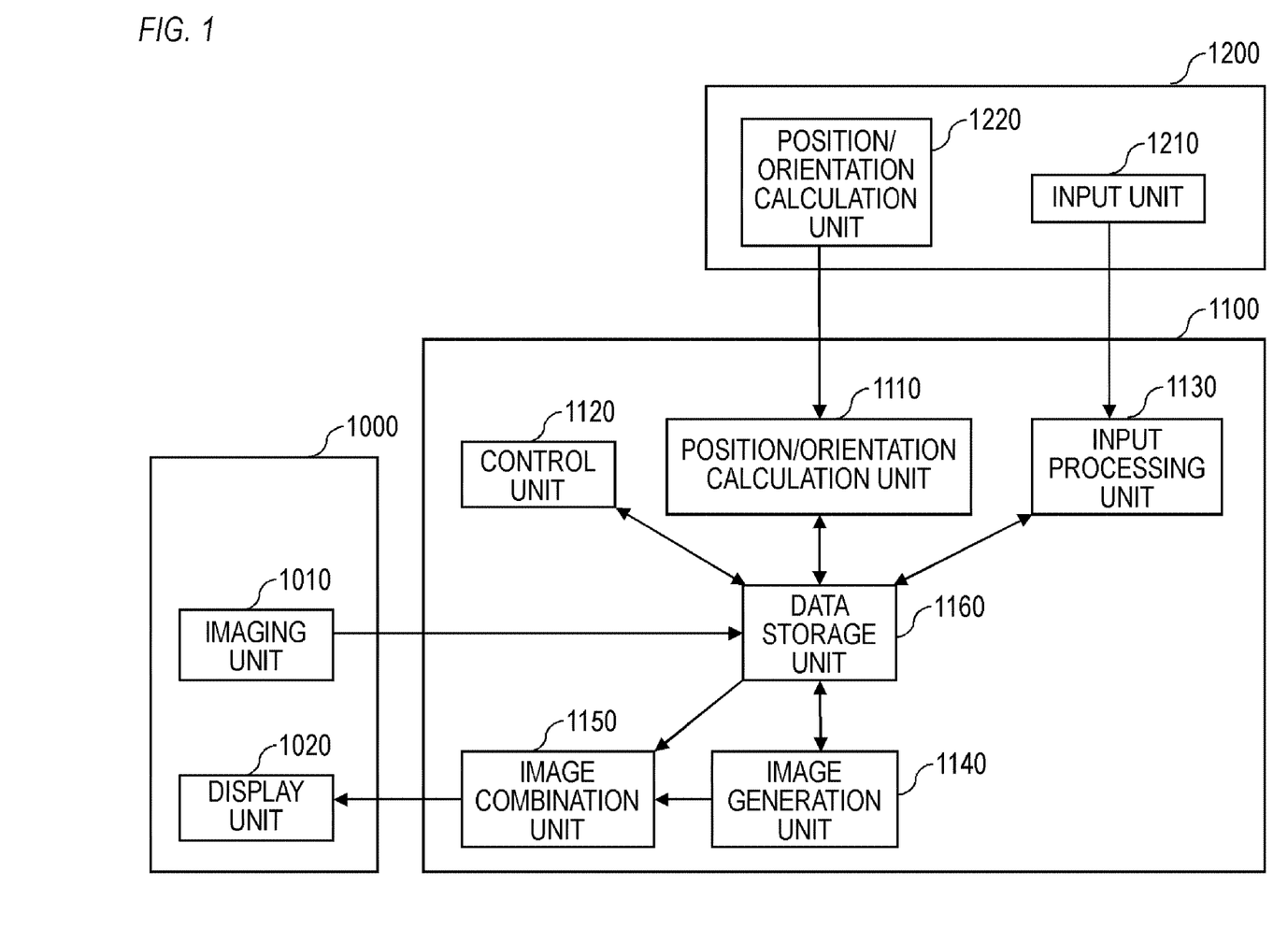
FIG. 1 is a block diagram showing a configuration example of a system according to a first embodiment.

FIG. 1 is a block diagram showing a configuration example of a system according to a first embodiment. The system according to the first embodiment is an image processing system for presenting a mixed reality space (MR space) in which a reality space and a virtual space are merged with each other to a system experiencing person (user). The first embodiment will describe a case in which a combined image obtained by combining a virtual-space image drawn by computer graphics (CG) and a reality-space image together is displayed to present an MR space to a user.

The system according to the first embodiment includes a display apparatus 1000, an information processing apparatus 1100, and an input apparatus 1200.

The information processing apparatus 1100 combines a reality-space image imported from the display apparatus 1000 with a virtual-space image generated by the information processing apparatus 1100 to generate a combined image. The information processing apparatus 1100 outputs the combined image to the display apparatus 1000 as a mixed reality image (MR image). Note that the first embodiment relates to an information processing apparatus that causes a virtual-space image to be displayed, and the system according to the first embodiment is not limited to an MR system that causes an MR image (an image obtained by combining a reality-space image with a virtual-space image) to be displayed. That is, the system according to the first embodiment may be a VR (Virtual Reality) system that presents only a virtual-space image to the user, an AR (Augmented Reality) system that presents a virtual-space image to the user over a reality space, or the like.

The display apparatus 1000 has an imaging unit 1010 and a display unit 1020.

The imaging unit 1010 continuously captures a reality-space image in a time series manner and outputs the captured reality-space image (captured image) to the information processing apparatus 1100. The imaging unit 1010 may include a stereo camera composed of two mutually-fixed cameras so as to enable the capturing of a reality-space image in a visual-line direction from the eyes of the user.

The display unit 1020 displays an MR image output from the information processing apparatus 1100. The display unit 1020 may include two displays arranged so as to correspond to the right and left eyes of the user. In this case, an MR image for the left eye is displayed on a display corresponding to the left eye of the user, and an MR image for the right eye is displayed on a display corresponding to the right eye of the user.

The display apparatus 1000 is, for example, a head-mounted-type display apparatus (HMD). However, the display apparatus 1000 is not limited to the HMD but may be a hand-held display (HHD). The HHD is a display held by a hand. That is, the display apparatus 1000 may be a display that is held by the user with his/her hand and enables the user to observe an image when he/she looks into the display like a binocular. Further, the display apparatus 1000 may be a display terminal such as a tablet and a smart phone.

The input apparatus 1200 has an input unit 1210 and a position/orientation calculation unit 1220. The input apparatus 1200 is, for example, an input apparatus for video games with which the user is enabled to acquire a value corresponding to the inclination direction of a stick, a value indicating the pressed state of a button, or the like. However, the input apparatus 1200 is not limited to an input apparatus such as an input apparatus for video games that is held by a hand of the user but may be an input apparatus attached to the body, hand, or the like of the user. The input apparatus 1200 may be, for example, a ring-shaped apparatus attachable to a finger of the user.

The input unit 1210 outputs a value corresponding to the operation of the user (a value corresponding to the inclination direction of a stick or the pressed state of a button) to the input processing unit 1130 as operation information.

The position/orientation calculation unit 1220 calculates (acquires) the position/orientation (position and orientation) of the input apparatus 1200 in a world coordinate system. Then, the position/orientation calculation unit 1220 outputs information on the calculated position/orientation to the input processing unit 1130. The position/orientation calculation unit 1220 has, for example, a sensor (such as an angular speed sensor, an acceleration sensor, and a geomagnetic sensor) for calculating the position/orientation of the input apparatus 1200. Note that the position/orientation calculation unit 1220 may have a plurality of sensors. Further, the position/orientation calculation unit 1220 may include an imaging unit and an imaging processing unit and calculate the position/orientation of the input apparatus 1200 by performing the processing of Simultaneous Localization and Mapping (SLAM) on the basis of the feature points of a captured image. Further, the position/orientation calculation unit 1220 may calculate a position/orientation in synchronization with an optical sensor installed in a reality space. Note that the position/orientation calculation unit 1220 may not calculate both values of a position component and an orientation component but may calculate one of the values. Further, the position/orientation calculation unit 1220 may output a value (a value output from a sensor), an image, or the like for calculating the position/orientation of the input apparatus 1200 to the information processing apparatus 1100 so that the position/orientation calculation unit 1110 of the information processing apparatus 1100 calculates the position/orientation of the input apparatus 1200.

Further, the information processing apparatus 1100 and the display apparatus 1000 are connected so as to be capable of mutually performing data communication. The information processing apparatus 1100 and the input apparatus 1200 are connected so as to be capable of mutually performing data communication. Note that the data communication may be wired communication or wireless communication. Further, the display apparatus 1000 may include the information processing apparatus 1100.

The information processing apparatus 1100 has a position/orientation calculation unit 1110, a control unit 1120, an input processing unit 1130, an image generation unit 1140, an image combination unit 1150, and a data storage unit 1160.

The position/orientation calculation unit 1110 calculates the position/orientation of the imaging unit 1010 in a world coordinate system. Specifically, the position/orientation calculation unit 1110 extracts a marker allocated to the world coordinate system from a reality-space image captured by the imaging unit 1010. Then, the position/orientation calculation unit 1110 calculates, on the basis of the extracted position/orientation of the marker, the position/orientation of the imaging unit 1010 in the world coordinate system. After that, the position/orientation calculation unit 1110 stores information indicating the calculated position/orientation of the imaging unit 1010 (information on the position/orientation) in the data storage unit 1160.

Further, the position/orientation calculation unit 1110 calculates, using information on the position/orientation of the input apparatus 1200 acquired from the position/orientation calculation unit 1220 or a reality-space image captured by the imaging unit 1010, the position/orientation of the input apparatus 1200 in the world coordinate system. At this time, there is a case where a difference (error) occurs between the calculated position/orientation of the input apparatus 1200 and an actual position/orientation depending on the calculation method of the position/orientation calculation unit 1220. For example, in a method for calculating a position/orientation using a combination of an angular speed sensor, an acceleration sensor, and a geomagnetic sensor, there is a case where a position/orientation having an error with respect to an actual position/orientation is calculated when the errors of the respective sensors are accumulated. Alternatively, there is a case where the position/orientation of the input apparatus 1200 is not calculatable. Further, in a method for calculating a position/orientation using an optical sensor installed in a reality space, there is a case where a position/orientation having an error with respect to an actual position/orientation is calculated when the optical sensor is intercepted by another reality object. Alternatively, there is a case where a position/orientation is not calculatable even in this method. In such a case, the position/orientation calculation unit 1110 is enabled to accurately calculate the position/orientation of the input apparatus 1200 on the basis of the position/orientation of a marker by extracting the marker attached to the input apparatus 1200 from a reality-space image captured by the imaging unit 1010. At this time, the position/orientation calculation unit 1110 may use all or a part of the calculation result of the position/orientation acquired from the position/orientation calculation unit 1220 of the input apparatus 1200. However, the calculation method of the position/orientation calculation unit 1110 is not limited to a method using a marker but may be a method calculated by the processing of SLAM. The position/orientation calculation unit 1110 stores information on the calculated position/orientation of the input apparatus 1200 in the data storage unit 1160.

When the input apparatus 1200 is not reflected in a reality-space image captured by the imaging unit 1010, the position/orientation calculation unit 1110 calculates the position/orientation of the input apparatus 1200 on the basis of a value acquired from the position/orientation calculation unit 1220 of the input apparatus 1200. At this time, the position/orientation calculation unit 1110 may calculate the position/orientation of the input apparatus 1200 on the basis of the value acquired from the position/orientation calculation unit 1220 and another information. For example, if the input apparatus 1200 includes an acceleration sensor or the like when the input apparatus 1200 is not reflected in a reality-space image, the position/orientation calculation unit 1110 may calculate the position/orientation of the input apparatus 1200 on the basis of the detection result of the acceleration sensor or the like. For example, the position/orientation calculation unit 1110 adds the position of the input apparatus 1200 at a past time at which the input apparatus 1200 was reflected in a reality-space image and the movement amount of the input apparatus 1200 since the time calculated from acceleration together. Thus, the position/orientation calculation unit 1110 may calculate the current position/orientation of the input apparatus 1200. Note that the position/orientation calculation unit 1110 may detect only the orientation of the input apparatus 1200 or may not be unable to calculate the position/orientation of the input apparatus 1200 when the input apparatus 1200 is not reflected in a reality-space image.

The control unit 1120 controls the whole information processing apparatus 1100. The control unit 1120 controls, on the basis of, for example, information on the position/orientation of the input apparatus 1200 stored in the data storage unit 1160, the position/orientation of a UI (graphic) displayed on the display unit 1020. Note that the position of the UI is shown by, for example, three-dimensional coordinate information corresponding to the orthogonal coordinate system of the three axes of X, Y, and Z axes. When the UI is a virtual light (ray) emitted from a hand of the user, the position of the UI is, for example, the start point or end point of the ray. Further, the orientation of the UI corresponds to the direction of the UI in a three-dimensional virtual space. When the UI is a ray, the orientation of the UI corresponds to, for example, a direction in which the ray extends.

The input processing unit 1130 changes, on the basis of operating information acquired from the input unit 1210, data relating to respective virtual objects stored in the data storage unit 1160, data relating to a light source that irradiates a virtual space with light, or the like. Then, the input processing unit 1130 stores the changed contents of the data relating to the respective virtual objects and the changed contents of the data relating to the light source that irradiates the virtual space with light in the data storage unit 1160.

The image generation unit 1140 constructs a virtual space on the basis of virtual-space data stored in the data storage unit 1160. The virtual-space data includes data relating to respective virtual objects constructing a virtual space, data relating to a light source that irradiates a virtual space with light, or the like. Then, the image generation unit 1140 acquires information on the position/orientation of the imaging unit 1010 calculated by the position/orientation calculation unit 1110 from the data storage unit 1160. Further, the image generation unit 1140 acquires information on the position/orientation of a UI controlled by the control unit 1120 from the data storage unit 1160. The image generation unit 1140 generates a virtual-space image corresponding to the position/orientation of the imaging unit 1010. Note that a technology for generating a virtual-space image corresponding to the position/orientation of the imaging unit 1010 is a known technology and therefore its detailed description will be omitted.

The image combination unit 1150 combines a virtual-space image generated by the image generation unit 1140 with a reality-space image captured by the imaging unit 1010 to generate an MR image. At this time, the virtual-space image generated by the image generation unit 1140 may be an image representing the whole virtual space or an image representing a part of the virtual space. Further, the image combination unit 1150 may perform affine transformation on an image to generate an MR image, or may allocate the image to a parametric curved surface to generate an MR image. Then, the image combination unit 1150 outputs the generated MR image to the display unit 1020.

The data storage unit 1160 stores various information as described above. The data storage unit 1160 includes a RAM, a hard disk drive, or the like. Note that the data storage unit 1160 stores, besides the information described above as information stored in the data storage unit 1160, information described as known information in the first embodiment, or the like.

Further, the system according to the first embodiment may use a hand of the user instead of the input apparatus 1200. In this case, the input processing unit 1130 recognizes the movement (gesture) of the hand of the user from a reality-space image captured by the imaging unit 1010. The input processing unit 1130 changes, on the basis of the recognized gesture, data relating to respective virtual objects stored in the data storage unit 1160, data relating to a light source that irradiates a virtual space with light, or the like. Then, the input processing unit 1130 stores the changed contents of the data relating to the respective virtual objects, the changed contents of the data relating to the light source that irradiates the virtual space with light in the data storage unit 1160.

Image Generation Processing

Figure 2:
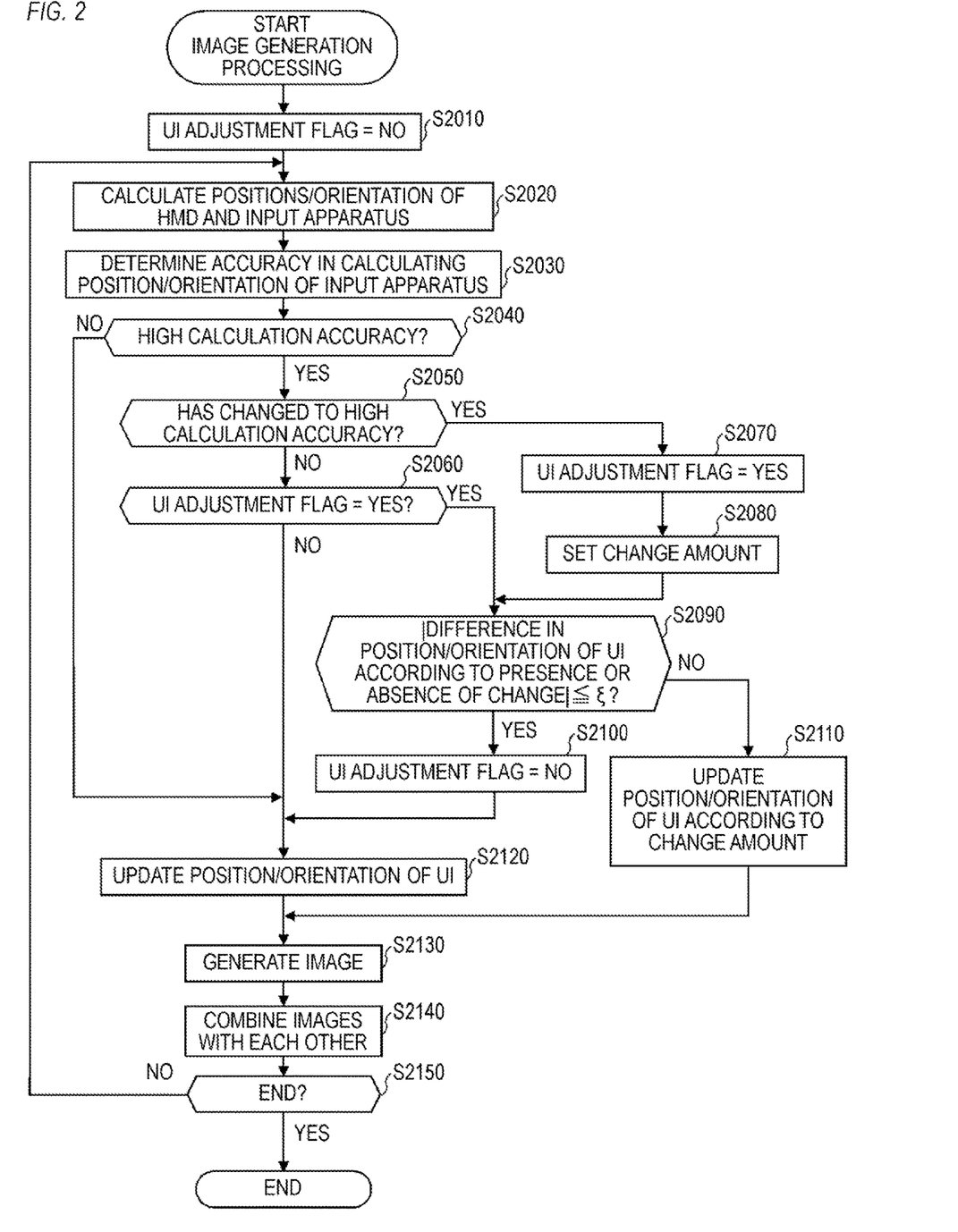
FIG. 2 is a flowchart of image generation processing according to the first embodiment.

FIG. 2 is a flowchart of image generation processing performed by the information processing apparatus 1100 to generate an MR image and output the generated MR image to the display apparatus 1000.

In step S2010, the control unit 1120 sets a UI adjustment flag indicating whether to perform the adjustment of a UI at NO.

In step S2020, the control unit 1120 controls the position/orientation calculation unit 1110 so as to calculate the position/orientation (the position/orientation of a virtual view point) of the display apparatus 1000 (the imaging unit 1010) and the position/orientation of the input apparatus 1200.

In step S2030, the control unit 1120 determines whether the state (hereinafter called the "calculation accuracy state") of accuracy in calculating the position/orientation of the input apparatus 1200 is a first state or a second state. The first state is a high-accuracy state in which the position/orientation is calculated with accuracy higher than predetermined accuracy. The control unit 1120 determines that the calculation accuracy state is the first state, for example, when the input apparatus 1200 is reflected in a reality-space image captured by the imaging unit 1010 and the position/orientation of the input apparatus 1200 is calculated using the reality-space image. The control unit 1120 determines that the calculation accuracy state is the second state (that is not the high-accuracy state), for example, when the input apparatus 1200 is not reflected in the reality-space image captured by the imaging unit 1010. The second state is a state in which the position/orientation is not calculated with accuracy higher than the predetermined accuracy. For example, the second state may be a state in which the position/orientation is not calculated or a state in which the position/orientation is calculated with accuracy lower than the predetermined accuracy.

Further, the control unit 1120 may determine the calculation accuracy state on the basis of information on the position/orientation of the input apparatus 1200 at a plurality of time points. For example, the control unit 1120 may determine that the calculation accuracy state is the second state when the difference between the current position/orientation of the input apparatus 1200 and the preceding (last) position/orientation of the input apparatus 1200 is at least a threshold (such as when the calculated value of the position/orientation has jumped and when the calculated value has jittered). Further, when information output from the input apparatus 1200 includes information on the calculation accuracy state, the control unit 1120 may determine the calculation accuracy state on the basis of the information. Alternatively, the control unit 1120 may determine the calculation accuracy state on the basis of the plurality of information described above.

In step S2040, the control unit 1120 determines whether the calculation accuracy state is the first state (high-accuracy state). The control unit 1120 proceeds to step S2050 when determining that the calculation accuracy state is the first state, or proceeds to step S2120 when determining that the calculation accuracy state is not the first state (the calculation accuracy state is the second state).

In step S2050, the control unit 1120 determines whether the calculation accuracy state has changed from the second state (low-accuracy state) to the first state (high-accuracy state) until (current) step S2040. For example, when having had determined in the last step S2040 that the calculation accuracy state is the second state, the control unit 1120 determines that the calculation accuracy state has changed from the second state to the first state. The control unit 1120 proceeds to step S2070 when determining that the calculation accuracy state has changed from the second state to the first state, or proceeds to step S2060 when determining that the calculation accuracy state has not changed (the first state has been maintained).

In step S2060, the control unit 1120 determines whether the UI adjustment flag is YES. The control unit 1120 proceeds to step S2090 when the UI adjustment flag is YES, or proceeds to step S2120 when the UI adjustment flag is NO.

In step S2070, the control unit 1120 sets the UI adjustment flag at YES.

In step S2080, the control unit 1120 sets the change amount of a UI on the basis of the position/orientation of the UI when the calculation accuracy state shifts from the second state (not high-accuracy state) to the first state (high-accuracy state). Here, the change amount is a parameter used to prevent the position/orientation of the UI from largely changing when the calculation accuracy state shifts from the second state to the first state. The control unit 1120 sets, on the basis of first information that is information on the position/orientation of the UI in the first state and second information that is information on the position/orientation of the UI in the second state, a change amount by which the position/orientation of the UI is changed according to the first information. For example, in step S2080, the control unit 1120 sets the difference between the first information (for example, the position/orientation of the UI immediately after the calculation accuracy state has changed to the first state) and the second information (for example, the position/orientation of the UI immediately before the calculation accuracy state changes to the first state) as the change amount. The change amount is calculated as a three-dimensional parameter. Note that the control unit 1120 may use a parameter other than the change amount so long as a difference in the position/orientation of the UI is acquirable when the calculation accuracy state shifts from the second state to the first state.

In step S2090, the control unit 1120 determines whether the difference in a specific two-dimensional plane coordinate system between the position/orientation of the UI after consideration is given to the change amount (after the reflection of the change amount) and the position/orientation of the UI before consideration is given to the change amount is not more than a reference value &. The specific two-dimensional plane coordinate system is a two-dimensional plane coordinate system perpendicular to the light-axis direction of the imaging unit 1010 (a depth direction in a camera coordinate system) or a two-dimensional plane coordinate system perpendicular to the front direction of the user. The control unit 1120 proceeds to step S2100 when the difference in the position/orientation is not more than the reference value &, or proceeds to step S2110 when the difference is larger than the reference value. The position/orientation of the UI after consideration is given to the change amount is the position/orientation of the UI obtained when the position/orientation of the UI corresponding to the first information (information based on the calculation result of the position/orientation of the input apparatus 1200) is changed by the change amount set in step S2080. The position/orientation of the UI before consideration is given to the change amount is the position/orientation of the UI corresponding to the first information based on the calculation result of the position/orientation of the input apparatus 1200.

In step S2100, the control unit 1120 changes the UI adjustment flag from YES to NO.

In step S2110, the control unit 1120 updates (determines) the position/orientation of the UI on the basis of the calculation result of the position/orientation of the input apparatus 1200 and the change amount. For example, the control unit 1120 determines a position/orientation obtained by changing the position/orientation of the UI based on the calculation result of the position/orientation of the input apparatus 1200 according to the change amount set in step S2080 as the updated position/orientation of the UI. Then, the control unit 1120 outputs information on the updated position/orientation of the UI to the data storage unit 1160.

In step S2120, the control unit 1120 updates the position/orientation of the UI on the basis of the calculation result of the position/orientation of the input apparatus 1200. Then, the control unit 1120 stores information on the updated position/orientation of the UI in the data storage unit 1160.

In step S2130, the control unit 1120 controls the image generation unit 1140 so as to generate a virtual-space image on the basis of the position/orientation of the virtual view point calculated in step S2020 and the position/orientation of the UI set in step S2110 or S2120.

In step S2140, the control unit 1120 controls the image combination unit 1150 so as to combine a reality image obtained by capturing an image of a reality space by the imaging unit 1010 with the virtual-space image generated in step S2130 to generate an MR image.

In step S2150, the control unit 1120 ends the processing when an instruction to end the processing is provided or when a condition for ending the processing is satisfied. On the other hand, the control unit 1120 returns to step S2020 and repeatedly performs the processing when the instruction to end the processing is not provided and when the condition for ending the processing is not satisfied.

FIGS. 3A to 3F are diagrams each showing the relationship between the combination result of an image generated by the image combination unit 1150 and the position/orientation of the input apparatus 1200. With reference to FIGS. 3A to 3F, an example of controlling the position/orientation of a UI that synchronizes with the input apparatus 1200 will be described.

An image 3010 is an image that represents a reality space and is obtained when the imaging unit 1010 captures an image of the reality space. A virtual object 3020 is a virtual object drawn as video obtained when a virtual space stored in the data storage unit 1160 is viewed from the display apparatus 1000. A hand 3030 is a hand of the user with the input apparatus 1200 attached thereto. Further, UIs 3050, 3070, 3090, 3110, 3140, and 3170 are UIs that move (are displayed) in synchronization with the movement of the input apparatus 1200. UIs 3120 and 3150 are UIs that are not actually displayed. Note that the UI in each of FIGS. 3A to 3F is formed in a triangular shape but may be formed in any shape other than the triangular shape so long as a portion indicated by the UI is recognizable by the user.

Figure 3A:
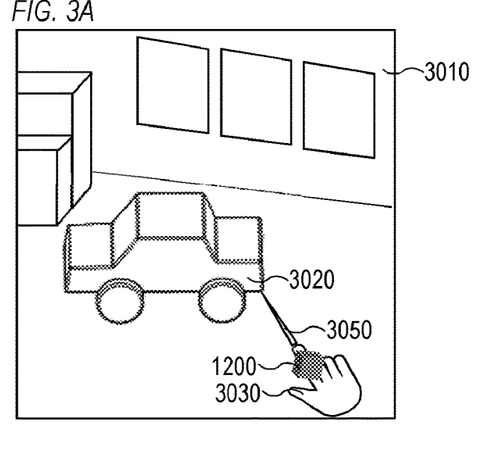
FIGS. 3A to 3F are diagrams each showing an example of controlling a UI according to the first embodiment.

FIG. 3A is a diagram in a case in which the input apparatus 1200 is present inside the visual field (angle of view; imaging range) of the imaging unit 1010. In the case of FIG. 3A, the position/orientation calculation unit 1110 is capable of calculating (acquiring) the position/orientation of the input apparatus 1200 using an image obtained when the imaging unit 1010 captures an image of a reality space. Accordingly, the position/orientation of the input apparatus 1200 is calculated with high accuracy. The control unit 1120 is enabled to display the UI 3050 and indicate the virtual object 3020 on the basis of the calculation result of the position/orientation of the input apparatus 1200.

Figure 3B:
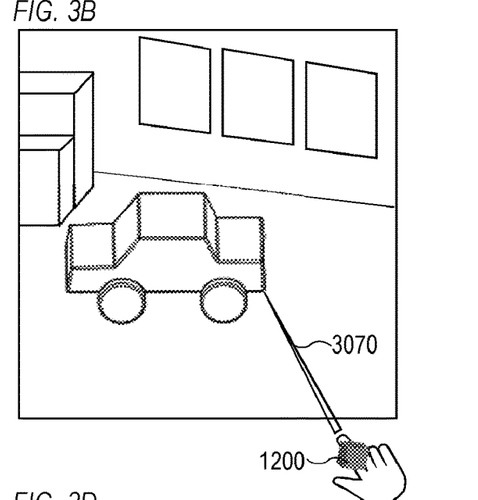

FIG. 3B is a diagram in a case in which the input apparatus 1200 is present outside the visual field of the imaging unit 1010. For example, if a time at which the user continues to use the input apparatus 1200 is shorter than a predetermined time in a state in which the input apparatus 1200 is present outside the visual filed of the imaging unit 1010, a significant error does not occur in the calculation result of the position/orientation of the input apparatus 1200 with respect to an actual position/orientation. Accordingly, the relationship of the position/orientation between the UI 3070 and the input apparatus 1200 in FIG. 3B is maintained to be the same as that of the position/orientation between the UI 3050 and the input apparatus 1200 in FIG. 3A.

Figure 3C:
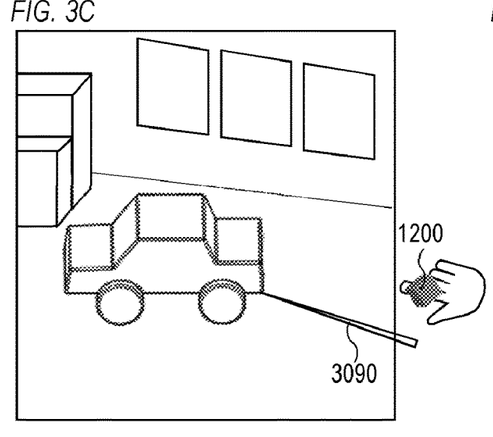

FIG. 3C is a diagram in a case in which the input apparatus 1200 has moved outside the visual field of the imaging unit 1010. An error occurs in the calculation result of the position/orientation of the input apparatus 1200 with respect to an actual position/orientation. Such an error possibly occurs in, for example, a case in which the user continues to use the input apparatus 1200 for a time longer than a predetermined time in a state in which the input apparatus 1200 is present outside the visual field of the imaging unit 1010. Note that FIG. 3C shows a state in which an error occurs in the calculation result of the position/orientation of the input apparatus 1200 but the user is enabled to indicate the virtual object 3020 like the states of FIGS. 3A and 3B. Note that the control unit 1120 may update the position/orientation of the UI 3090 or may update only the orientation on the basis of information on the position/orientation of the input apparatus 1200 acquired from the input apparatus 1200 in a state in which the input apparatus 1200 is present outside the visual field of the imaging unit 1010. Further, the control unit 1120 may not update the position/orientation of the UI 3090. For example, when a hand of the user is used instead of the input apparatus 1200, the control unit 1120 may not update the position/orientation of the UI 3090 in a state in which the input apparatus 1200 is present outside the visual field of the imaging unit 1010.

Figure 3D:
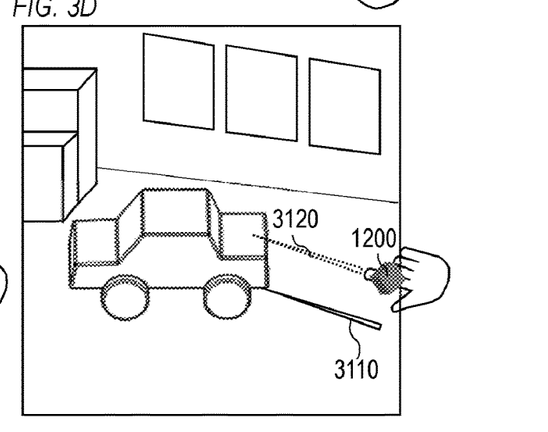

FIG. 3D is a diagram in a case in which the input apparatus 1200 has moved from the outside to the inside of the visual field of the imaging unit 1010. The UI 3110 is displayed in a position/orientation changed from the position/orientation of the UI 3120 based on the calculated position/orientation of the input apparatus 1200 by the error (difference) between the position/orientation of the input apparatus 1200 immediately before the state of FIG. 3D is created and a position/orientation calculated in the state of FIG. 3D. Since the input apparatus 1200 is present inside the visual field of the imaging unit 1010 in FIG. 3D, the position/orientation calculation unit 1110 is capable of calculating the position/orientation of the input apparatus 1200 with high accuracy like FIG. 3A. Therefore, in FIG. 3D, the control unit 1120 is capable of cancelling the error present in the state of FIG. 3C and displaying the UI in the position of the UI 3120. However, when the UI is displayed in the position of the UI 3120, the UI indicates a portion different from the portion of the virtual object having been indicated so far, which makes the user have an uncomfortable feeling in some cases. In view of this, the control unit 1120 displays the UI 3110 of which the position/orientation is changed from the position/orientation of the UI 3120 instead of the UI 3120 based on the calculated position/orientation of the input apparatus 1200. For example, the UI 3110 immediately after the state of FIG. 3D has been created is displayed as if the input apparatus 1200 were moved from the position/orientation of the input apparatus 1200 immediately before the state of FIG. 3D is created.

Figure 3E:
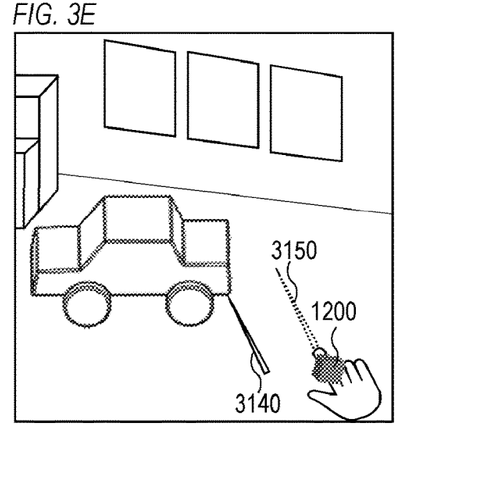

FIG. 3E is a diagram in a case in which the input apparatus 1200 has moved inside the visual field of the imaging unit 1010 in a state in which the UI indicates the same position as the position indicated in FIG. 3D. The control unit 1120 displays the UI 3140 instead of the UI 3150 with consideration given to the change amount of the UI like the case of FIG. 3D. The UI 3140 is enabled to indicate the position of the virtual object 3020 that is the same as the position indicated in FIG. 3D.

Figure 3F:
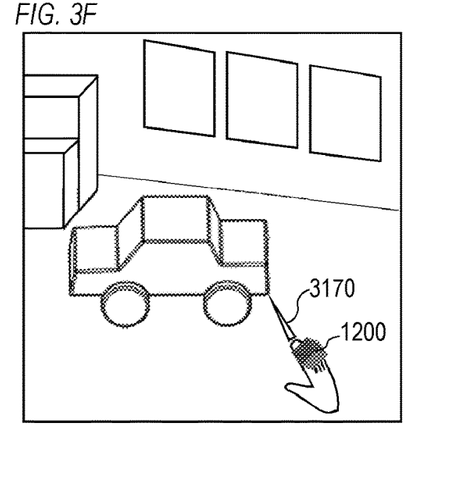

FIG. 3F is a diagram in a case in which the hand 3030 with the input apparatus 1200 attached thereto has moved so as to rotate in a state in which the UI indicates the same position as the position indicated in FIG. 3E. In the state of FIG. 3F, the difference between the position of the UI displayed as the combination result of an image (the UI after consideration is given to a change amount) and the UI having cancelled the change amount (the UI before consideration is given to the change amount) becomes not more than a reference value}. For example, it is assumed in FIG. 3E that a difference occurs only in a horizontal direction between the UI 3140 and the UI 3150. When the hand 3030 is moved so as to rotate from this state to create the state shown in FIG. 3F, a difference occurs in the depth direction of a camera coordinate system between the UI after consideration is given to the change amount and the UI before consideration is given to the change amount. However, the difference becomes not more than the reference value} in a surface perpendicular to the depth direction. As described above, when the difference (the difference in a specific two-dimensional plane coordinate system) between the displayed (projected) UIs becomes not more than the reference value}, the control unit 1120 cancels the change amount of the UI and displays the UI 3170 on the basis of the original position/orientation of the input apparatus 1200 as shown in FIG. 3A.

In the first embodiment, a change amount is defined in, for example, a coordinate system based on a hand of the user, an object (such as the input apparatus 1200) attached to the hand, or the like. Therefore, even if the position of a UI is changed to a left direction (a left direction when viewed from the user) at a certain timing, the UI is not always changed in the left direction. If a change amount is set so that the position of the UI is changed in a direction from an index finger to a thumb, the position of the UI is always changed to the direction from the index finger to the thumb. Therefore, the position of the UI is changed to a direction different from the left direction depending on the orientation of the hand of the user. From this reason, the changes as shown in FIGS. 3D to 3F possibly occur.

Note that the UIs 3120 and 3150 are described as being not actually displayed but the control unit 1120 may display the UIs 3120 and 3150 in a display state (display mode, display form, display style) different from those of the UIs 3050, 3070, 3090, 3110, 3140, and 3170 (main UIs). For example, the control unit 1120 may display the UIs 3120 and 3150 so as to be different from the main UIs in their colors, transparency, lighting states, blinking states, or the like. The control unit 1120 may display the UIs 3120 and 3150 in any display state so long as they are displayed in a state different from those of the main UIs. Further, the control unit 1120 may control the UIs 3110 and 3140 displayed with consideration given to the change amount to be displayed in a state different from those of the UIs 3050, 3070, 3090, and 3170 displayed without consideration given to the change amount (in a position/orientation corresponding to first information).

Modified Examples

In the first embodiment, the control unit 1120 determines whether to change a UI by a change amount depending on whether a difference in the position/orientation of the UI in a specific two-dimensional plane coordinate system is not more than a reference value between a case in which consideration is given to the change amount and a case in which consideration is not given to the change amount. However, a determination condition is not limited to this. For example, the control unit 1120 may determine whether to change a UI depending on whether a difference in the position/orientation of the UI in a three-dimensional coordinate system is not more than a reference value between a case in which consideration is given to a change amount and a case in which consideration is not given to the change amount.

Further, the control unit 1120 may determine whether an object indicated by a UI changes to another object between a case in which consideration is given to a change amount and a case in which consideration is not given to the change amount to control the position/orientation of the UI. At this time, when the objects indicated by the UI are different from each other between the two cases, the control unit 1120 considers the change amount and updates the UI with a changed position/orientation. When the objects indicated by the UI are the same between the two cases, the control unit 1120 updates the UI with a position/orientation not considering the change amount. The control unit 1120 determines whether an object indicated by a UI changes to another object between a case in which consideration is given to a change amount and a case in which consideration is not given to the change amount, for example, when a virtually-displayed menu or a button in the menu is indicated by the user.

Besides, the control unit 1120 may determine whether the user is using a UI to control the position/orientation of the UI. When determining that the user is using the UI in this case, the control unit 1120 considers a change amount and updates the UI with a changed position/orientation. When determining that the user is not using the UI, the control unit 1120 updates the UI with a position/orientation not considering the change amount. Further, the control unit 1120 may combine a plurality of conditions together to control the position/orientation of the UI. A method for determining whether the user is using the UI may be based on whether the user holds the input apparatus 1200 or whether the movement amount of the input apparatus 1200 is at least a reference value. For example, when the user holds the input apparatus 1200 or when the movement amount of the input apparatus 1200 is at least a threshold, the control unit 1120 determines that the user is using the UI. Note that a determination as to whether the user is using the UI is based on whether an object is indicated by the UI or whether the voice of the user is acquired. The determination as to whether the user is using the UI may be made by any known technology.

Further, even in a state in which the control unit 1120 performs control with consideration given to a change amount, the change amount may be forcibly controlled so as not to be considered (the change amount may be controlled to be cancelled) according to the operation of the user. Further, when a position indicated by a UI or the position of the UI is a peripheral visual field in the display apparatus 1000 (for example, the end of the imaging range of the imaging unit 1010), a change amount may be forcibly controlled so as not to be considered. Further, when consideration is given to a change amount, the control unit 1120 may change the position and orientation of a UI or may change one of the position and orientation.

Second Embodiment

In the first embodiment, a change amount used to control the position/orientation of a UI is controlled to be constant. However, the position/orientation of a UI may be controlled with a change amount gradually reducing.

Figure 4:
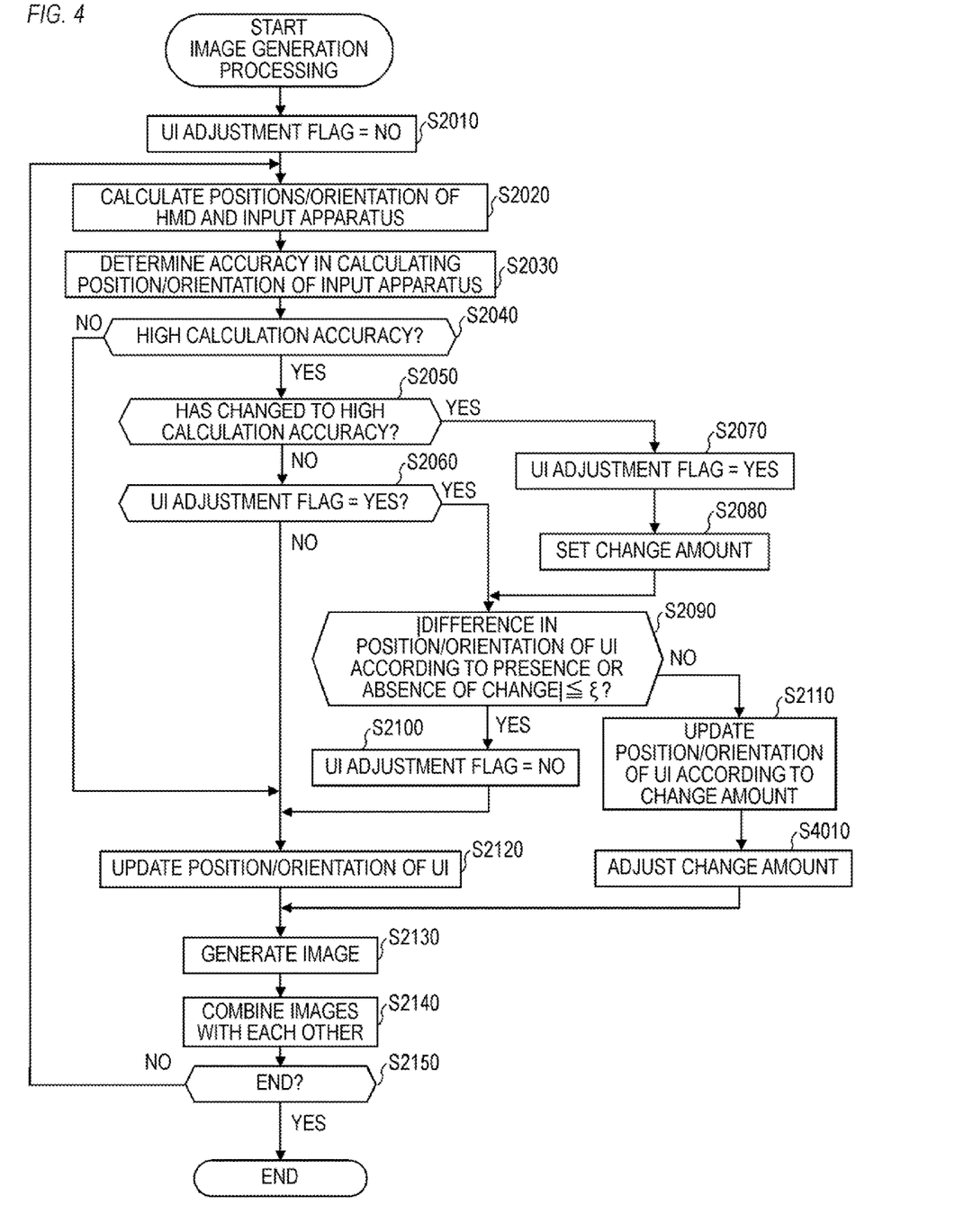
FIG. 4 is a flowchart of image generation processing according to a second embodiment.

FIG. 4 is a flowchart of image generation processing performed by an information processing apparatus 1100 to generate an MR image and output the generated MR image to a display apparatus 1000. In FIG. 4, the same steps as those of FIG. 2 will be denoted by the same symbols, and their descriptions will be omitted.

In step S4010, a control unit 1120 adjusts a change amount set in step S2080 to be smaller than a change amount set last time. The change amount may be adjusted by, for example, multiplying the change amount by a coefficient of less than 1 or multiplying the change amount by a different coefficient of not more than 1 for each component of the position/orientation of the change amount. Further, the change amount may be adjusted by a function with which the change amount is adjusted according to a temporal change or a function that uses the component of the position/orientation of an imaging unit 1010 or an input apparatus 1200 as variables. The change amount may be adjusted by any method so long as the change amount gradually reduces and the position/orientation of a displayed UI gradually gets close to the position/orientation of a UI corresponding to first information.

FIGS. 5A to 5F are diagrams each showing the relationship between the combination result of an image generated by an image combination unit 1150 and the position/orientation of the input apparatus 1200. With reference to FIGS. 5A to 5F, an example of controlling the position/orientation of a UI that synchronizes with the input apparatus 1200 while gradually reducing a change amount will be described. In FIGS. 5A to 5F, the same portions as those of FIGS. 3A to 3F will be denoted by the same symbols, and their descriptions will be omitted. Since FIGS. 5A to 5D and FIG. 5F are diagrams showing the same states as those of FIGS. 3A to 3D and FIG. 3F, their descriptions will be omitted.

Figure 5A:
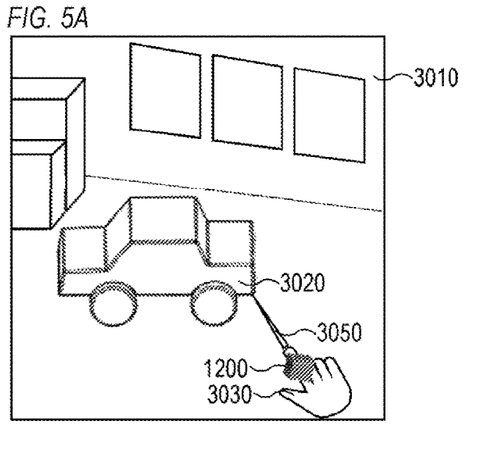
FIGS. 5A to 5F are diagrams each showing an example of controlling a UI according to the second embodiment.
Figure 5B:
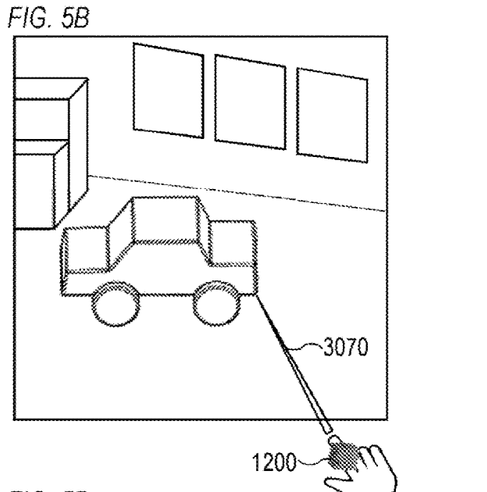
Figure 5C:
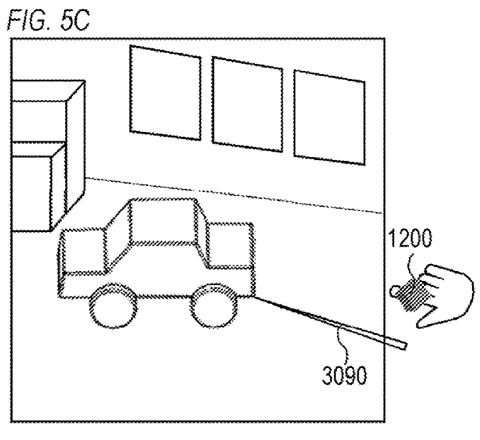
Figure 5D:
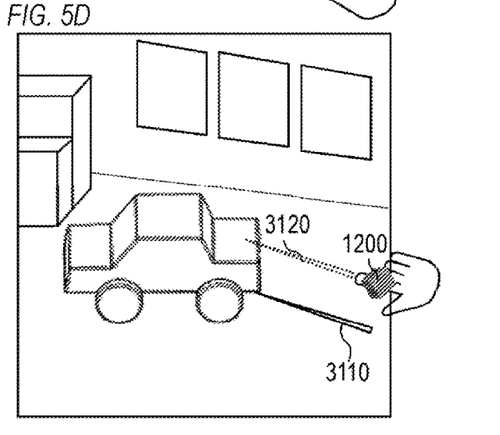
Figure 5E:
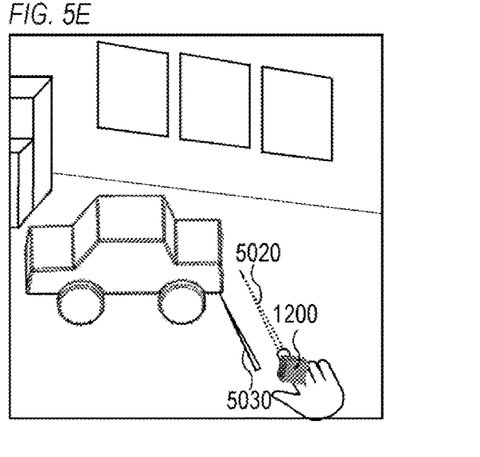
Figure 5F:
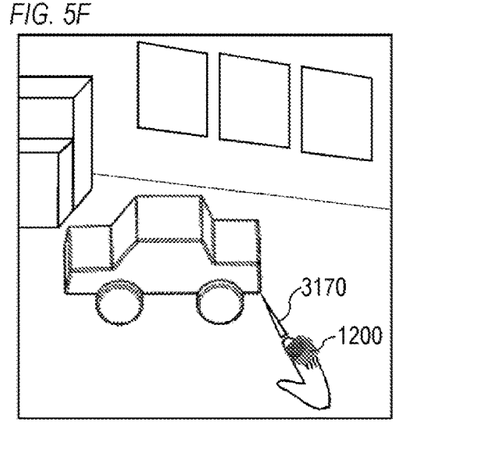

FIG. 5E is a diagram in a case in which the input apparatus 1200 has moved inside the visual field of an imaging unit 1010 while a UI indicates the same position as the position indicated in FIG. 5D. By gradually reducing a change amount, the control unit 1120 is enabled to display a UI 5030 so as get close to a UI 5020 in a case in which consideration is given to the change amount while indicating the position of a virtual object 3020 that is the same as the position indicated in FIG. 5D.

Third Embodiment

In the first and second embodiments, the change amount of a UI is the change amount (difference) of a calculated value of the position/orientation of the UI when the state (calculation accuracy state) of accuracy in calculating the position/orientation of an input apparatus 1200 shifts from a second state (not high-accuracy state) to a first state (high-accuracy state). Meanwhile, a control unit 1120 may set a change amount on the basis of the difference between a portion indicated by a UI in a second state and a portion indicated by the UI based on the position/orientation of the input apparatus 1200 in a first state. For example, the control unit 1120 sets a change amount so that a position based on the position/orientation of the input apparatus 1200 when a calculation accuracy state becomes a first state is the start point of a UI and a position indicated by the UI before the calculation accuracy state becomes the first state is the end point of the UI. In addition, the control unit 1120 gradually reduces a change amount in the third embodiment.

FIGS. 6A to 6F are diagrams each showing the relationship between the combination result of an image generated by an image combination unit 1150 and the position/orientation of the input apparatus 1200. With reference to FIGS. 6A to 6F, an example of controlling the position or orientation of the UI that synchronizes with the input apparatus 1200 while changing the orientation (direction) of a UI and gradually reducing a change amount will be described. In FIGS. 6A to 6F, the same portions as those of FIGS. 3A to 3F will be denoted by the same symbols, and their descriptions will be omitted. Since FIGS. 6A to 6C and FIG. 6F are diagrams showing the same states as those of FIGS. 3A to 3C and FIG. 3F, their descriptions will be omitted.

Figure 6A:
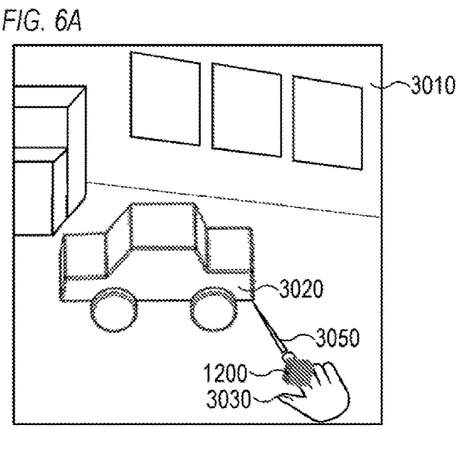
FIGS. 6A to 6F are diagrams each showing an example of controlling a UI according to a third embodiment.
Figure 6B:
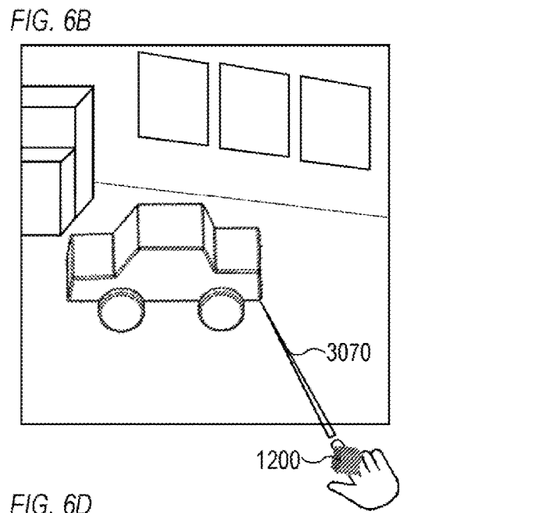
Figure 6C:
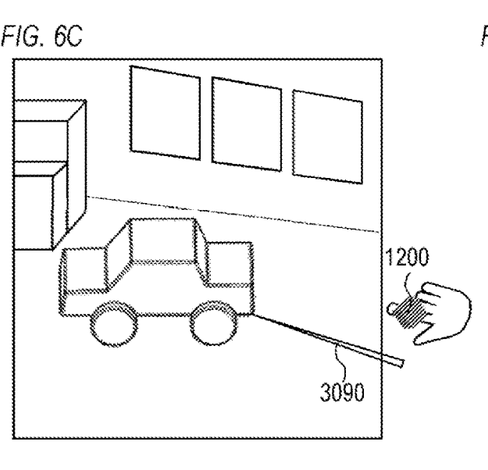
Figure 6D:
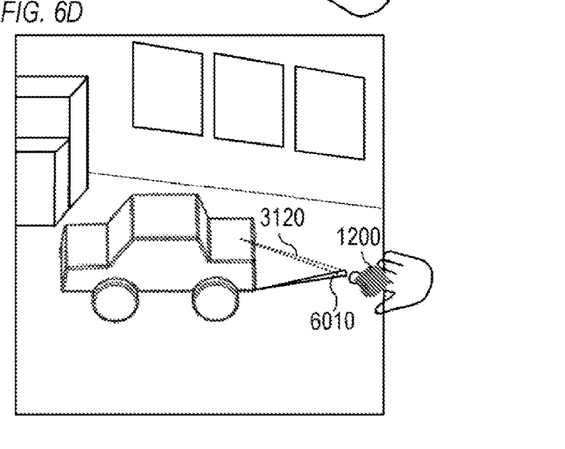

FIG. 6D is a diagram in a case in which the input apparatus 1200 has move from the outside to the inside of the visual field of an imaging unit 1010. The control unit 1120 sets the start point of a UI at a position based on the position/orientation of the input apparatus 1200 in the case of FIG. 6D in which consideration is given to a change amount. The control unit 1120 sets the change amount so that a position having been indicated by the UI immediately before FIG. 6D is maintained, and changes a UI 3120 to display a UI 6010.

Figure 6E:
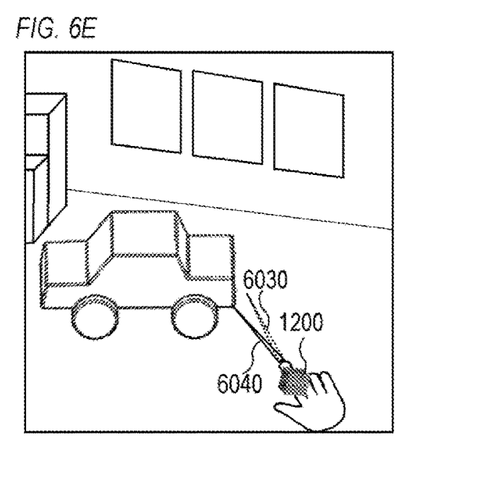
Figure 6F:
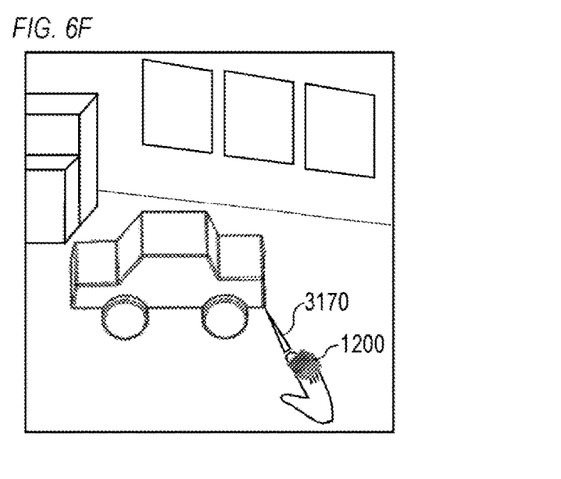

FIG. 6E is a diagram in a case in which the input apparatus 1200 has moved inside the visual field of the imaging unit 1010 while a UI indicates the same position as the position indicated in FIG. 6D. By gradually reducing a change amount, the control unit 1120 is enabled to display, while indicating the position of a virtual object 3020 that is the same as the position indicated in FIG. 6D, a UI 6040 so as get close to a UI 6030 at a position at which consideration is not given to a change amount.

Fourth Embodiment

The first to third embodiments describe an example in which all the respective units constituting the information processing apparatus 1100 shown in FIG. 1 are constituted by hardware. However, a part of the respective units may be constituted by software. In this case, a computer in which the remaining units are mounted as hardware is caused to perform the software. As a result, the computer performs the operation of the information processing apparatus 1100 described in the first to third embodiments.

Figure 7:
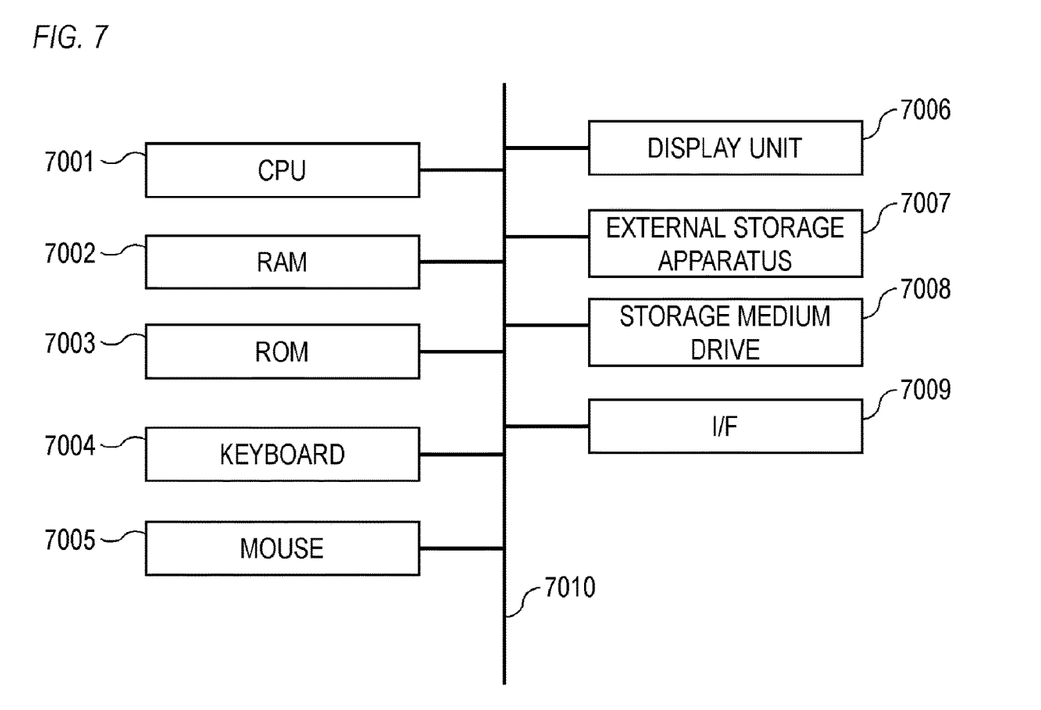
FIG. 7 is a block diagram showing a hardware configuration example according to a fourth embodiment.

FIG. 7 is a block diagram showing a hardware configuration example of a computer applicable to the information processing apparatus 1100.

A CPU 7001 controls the whole computer using a program or data stored in a RAM 7002 or a ROM 7003 and performs the respective processing described above as processing performed by the information processing apparatus 1100 in the first to third embodiments. The CPU 7001 is enabled to operate as the position/orientation calculation unit 1110, the control unit 1120, the input processing unit 1130, the image generation unit 1140, and the image combination unit 1150.

The RAM 7002 has an area for temporarily storing a program or data loaded from an external storage apparatus 7007 or a storage medium drive 7008. In addition, the RAM 7002 has an area for temporarily storing data received from an external apparatus via an I/F (interface) 7009. The external apparatus represents the display apparatus 1000 and the input apparatus 1200. Further, the data received from the external apparatus represents a reality-space image and an input value generated by the input apparatus 1200 in the case of the configuration shown in FIG. 1. In addition, the RAM 7002 also has a work area used by the CPU 7001 to perform respective processing. That is, the RAM 7002 is enabled to appropriately present various areas. For example, the RAM 7002 also functions as the data storage unit 1160 shown in FIG. 1.

In the ROM 7003, setting data for a computer, a boot program, or the like is stored.

A keyboard 7004 and a mouse 7005 are given as an example of an operation input apparatus and enabled to output various instructions to the CPU 7001 when operated by the user of the computer.

A display unit 7006 is constituted by a CRT (Cathode Ray Tube), a liquid crystal panel, or the like and enabled to display a processing result by the CPU 7001 as an image, text, or the like. For example, the display unit 7006 is enabled to display a message required to be displayed to measure the position/orientation of the display apparatus 1000, or the like.

The external storage apparatus 7007 is a storage apparatus that is represented by a hard disk drive and capable of storing a large capacity of information. In the external storage apparatus 7007, an OS (Operating System) or a program or data for causing the CPU 7001 to perform the respective processing described above as those performed by the information processing apparatus 1100 is stored. The program includes a program corresponding to each of the position/orientation calculation unit 1110, the control unit 1120, the input processing unit 1130, the image generation unit 1140, and the image combination unit 1150. Further, the data includes virtual-space data or the information described above as known information. The program or data stored in the external storage apparatus 7007 is appropriately loaded into the RAM 7002 according to the control of the CPU 7001. The CPU 7001 performs processing using the loaded program or data to perform the respective processing described above as processing performed by the information processing apparatus 1100. Note that the external storage apparatus 7007 may be used as the data storage unit 1160 shown in FIG. 1.

The storage medium drive 7008 performs the reading of a program or data stored in a storage medium such as a CD-ROM and a DVD-ROM, the writing of a program or data in the storage medium, or the like. Note that a part or all of the program or data described above as being stored in the external storage apparatus 7007 may be stored in the storage medium. The program or data read by the storage medium drive 7008 from the storage medium is output to the external storage apparatus 7007 or the RAM 7002.

An I/F 7009 has an analog video port for connecting the imaging unit 1010 of the display apparatus 1000 or a digital input/output port such as IEEE1394. The I/F 7009 also has an Ethernet™ port for outputting a combined image to the display unit 1020 of the display apparatus 1000, or the like.

Data received via the I/F 7009 is output to the RAM 7002 or the external storage apparatus 7007. Further, when a sensor system is used in the acquisition of a position/orientation, the I/F 7009 is connected to the sensor system. A bus 7010 is a bus for connecting the above respective units to each other.

The present invention is described in detail above on the basis of its preferred embodiments. However, the present invention is not limited to the specific embodiments and includes various modes without departing from its gist. A part of the embodiments may be appropriately combined together.

Note that the respective function units of the above respective embodiments (respective modified examples) may be or may not be separate hardware. The functions of at least two function units may be realized by common hardware. Each of a plurality of functions of one function unit may be realized by separate hardware. At least two functions of one function unit may be realized by common hardware. Further, the respective function units may be or may not be realized by hardware such as ASIC, FPGA, and DSP. For example, an apparatus may have a processor and a memory (storage medium) in which a program is stored. Further, the function of at least a part of the function units of the apparatus may be realized when the processor reads the control program from the memory and runs the read control program.

According to the present invention, it is possible to provide a highly-convenient user interface as a user interface such as a VR system and an MR system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-080036, filed on May 16, 2022, which is hereby incorporated by reference herein in its entirety.

What is claimed is:

1. An information processing apparatus comprising:
a processor; and
a memory storing a program which, when executed by the processor, causes the information processing apparatus to:
execute acquisition processing of acquiring information indicating a position or an orientation of an object for operating a virtual object; and
execute control processing of controlling a position or an orientation of a graphic corresponding to the object on a basis of the acquired information, wherein
in the control processing, when shifting from a second state in which the object is not reflected in a captured image to a first state in which the object is reflected in a captured image, the position or the orientation of the graphic in the first state is controlled on a basis of
first information that is information indicating the position or the orientation of the graphic in the first state and
second information that is information indicating the position or the orientation of the graphic in the second state.

2. The information processing apparatus according to claim 1, wherein
the second state is a state in which the information is not acquired.

3. The information processing apparatus according to claim 1, wherein
the second state is a state in which the information is acquired based on detection result of a sensor included in the object and not based on the captured image.

4. The information processing apparatus according to claim 1, wherein
in the control processing, when shifting from the second state to the first state, if a difference between the first information and the second information is larger than a threshold, the position or the orientation of the graphic in the first state is controlled on a basis of the first information and the second information.

5. The information processing apparatus according to claim 1, wherein
in the control processing, when shifting from the second state to the first state, if a difference in a position or an orientation in a specific two-dimensional plane coordinate system between the graphic in a position or an orientation corresponding to the first information and the graphic in a position or an orientation obtained by changing a position or an orientation corresponding to the second information by a change amount based on the first information and the second information is larger than a threshold, the position or the orientation of the graphic in the first state is controlled on a basis of the first information and the second information.

6. The information processing apparatus according to claim 1, wherein
in the control processing, when shifting from the second state to the first state, if a user uses the graphic, the position or the orientation of the graphic in the first state is controlled on a basis of the first information and the second information.

7. The information processing apparatus according to claim 6, wherein
a case in which the user uses the graphic is a case in which the user holds the object or a case in which a movement amount of the object is at least a threshold.

8. The information processing apparatus according to claim 1, wherein
in the control processing, when shifting from the second state to the first state, the position or the orientation of the graphic in the first state is determined by changing a position or an orientation of the graphic corresponding to the first information by a change amount based on the first information and the second information.

9. The information processing apparatus according to claim 8, wherein
in the control processing, when shifting from the second state to the first state, the position or the orientation of the graphic corresponding to the first information is changed by a change amount based on a difference between the first information and the second information.

10. The information processing apparatus according to claim 8, wherein
in the control processing, when shifting from the second state to the first state, the position or the orientation of the graphic corresponding to the first information is changed by a change amount based on a difference between a portion indicated by the graphic in the second state and a portion indicated by the graphic in a case in which the position or the orientation of the graphic is set at the position or the orientation corresponding to the first information.

11. The information processing apparatus according to claim 8, wherein
in the control processing, the change amount is gradually reduced.

12. The information processing apparatus according to claim 1, wherein
in the control processing, the position or the orientation of the graphic in the first state is controlled so that a portion indicated by the graphic in the second state is maintained even after the second state is shifted to the first state.

13. The information processing apparatus according to claim 1, wherein
in the control processing, the position or the orientation of the graphic in the first state is controlled so as to gradually come close to a position or an orientation of the graphic corresponding to the first information.

14. The information processing apparatus according to claim 1, wherein
in the control processing, in the first state, a display mode of the graphic is differentiated between a case, in which the graphic is displayed on a display in a position or an orientation based on the first information and the second information, and a case, in which the graphic is displayed on the display in a position and an orientation corresponding to the first information.

15. The information processing apparatus according to claim 1, wherein
in the control processing, in the first state, the graphic is displayed in a position and an orientation based on the first information and the second information and another graphic is displayed in a position and an orientation corresponding to the first information in a display mode different from a display mode of the graphic.

16. The information processing apparatus according to claim 1, wherein
in the acquisition processing, it is capable of acquiring the information using a captured image.

17. The information processing apparatus according to claim 1, wherein
the object is a ring-type controller attachable to a finger of a user.

18. The information processing apparatus according to claim 1, wherein
the information processing apparatus is a head-mounted display.

19. An information processing method comprising:
an acquisition step of acquiring information indicating a position or an orientation of an object for operating a virtual object; and
a control step of controlling a position or an orientation of a graphic corresponding to the object on a basis of the information acquired in the acquisition step, wherein
in the control step, when shifting from a second state in which the object is not reflected in a captured image to a first state in which the object is reflected in a captured image, the position or the orientation of the graphic in the first state is controlled on a basis of
first information that is information indicating the position or the orientation of the graphic in the first state and
second information that is information indicating the position or the orientation of the graphic in the second state.

20. A non-transitory computer readable medium that stores a program, wherein the program causes a computer to execute an information processing method comprising:
an acquisition step of acquiring information indicating a position or an orientation of an object for operating a virtual object; and
a control step of controlling a position or an orientation of a graphic corresponding to the object on a basis of the information acquired in the acquisition step, wherein
in the control step, when shifting from a second state in which the object is not reflected in a captured image to a first state in which the object is reflected in a captured image, the position or the orientation of the graphic in a first state is controlled on a basis of
first information that is information indicating the position or the orientation of the graphic in the first state and
second information that is information indicating the position or the orientation of the graphic in the second state.

* * * * *